(12) United States Patent
Gouzman et al.

(10) Patent No.: US 11,161,995 B2
(45) Date of Patent: Nov. 2, 2021

(54) BISMALEIMIDE-BASED SOLUTION FOR INKJET INK FOR THREE DIMENSIONAL PRINTING

(71) Applicant: Soreq Nuclear Research Center, Yavne (IL)

(72) Inventors: Irina Gouzman, Rehovot (IL); Nurit Atar, Mazkeret Batia (IL); Ronen Verker, Hod-Hasharon (IL); Assaf Bolker, Rehovot (IL); Eitan Grossman, Kiryat Ono (IL)

(73) Assignee: Soreq Nuclear Research Center, Yavne (IL)

( * ) Notice: Subject to any disclaimer, the term of this patent is extended or adjusted under 35 U.S.C. 154(b) by 25 days.

(21) Appl. No.: 16/316,356

(22) PCT Filed: Jul. 5, 2017

(86) PCT No.: PCT/IB2017/054054
§ 371 (c)(1),
(2) Date: Jan. 9, 2019

(87) PCT Pub. No.: WO2018/011674
PCT Pub. Date: Jan. 18, 2018

(65) Prior Publication Data
US 2019/0292389 A1    Sep. 26, 2019

Related U.S. Application Data

(60) Provisional application No. 62/360,537, filed on Jul. 11, 2016.

(51) Int. Cl.
| | |
|---|---|
| C09D 11/38 | (2014.01) |
| C08G 73/12 | (2006.01) |
| C09D 179/08 | (2006.01) |
| C09D 11/102 | (2014.01) |
| C09D 11/101 | (2014.01) |
| C09D 11/30 | (2014.01) |
| B33Y 70/00 | (2020.01) |
| B41M 7/00 | (2006.01) |

(52) U.S. Cl.
CPC ............. *C09D 11/38* (2013.01); *C08G 73/12* (2013.01); *C08G 73/128* (2013.01); *C09D 11/101* (2013.01); *C09D 11/102* (2013.01); *C09D 11/30* (2013.01); *C09D 179/08* (2013.01); *B33Y 70/00* (2014.12); *B41M 7/009* (2013.01); *B41M 7/0081* (2013.01)

(58) Field of Classification Search
CPC ....... C09D 11/101; C09D 11/30; C09D 11/38; C09D 11/102; C09D 179/08; C08G 73/128; C08G 73/12; B33Y 70/00; B33Y 7/0081; B33Y 7/009
See application file for complete search history.

(56) References Cited

U.S. PATENT DOCUMENTS

| | | |
|---|---|---|
| 6,746,778 B1 | 6/2004 | Negele |
| 2004/0029044 A1 | 2/2004 | Severance |
| 2011/0120753 A1 | 5/2011 | Ushiki |

FOREIGN PATENT DOCUMENTS

| | | |
|---|---|---|
| CN | 102311684 | 1/2012 |
| EP | 2722372 | 4/2014 |
| JP | 2006-052268 | 2/2006 |
| WO | 2010/107750 | 9/2010 |
| WO | 2014/206492 | 12/2014 |

OTHER PUBLICATIONS

PCT Search and Written Opinion PCT/IB2017/054054, dated Sep. 21, 2017.

*Primary Examiner* — Sanza L. McClendon
(74) *Attorney, Agent, or Firm* — Dekel Patent Ltd.; David Klein

(57) ABSTRACT

A polyimide-based solution for inkjet printing includes an α,ω-Bismaleimide(BMI) terminated oligomer, wherein said α,ω-Bismaleimide terminated oligomer is defined by formula (I), wherein R represents an aliphatic, an aromatic or mixed aliphatic and aromatic groups.

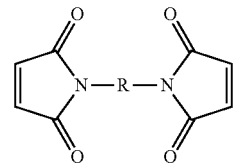

11 Claims, No Drawings

BISMALEIMIDE-BASED SOLUTION FOR INKJET INK FOR THREE DIMENSIONAL PRINTING

FIELD OF THE INVENTION

The present invention relates generally to polymeric ink composition for use in additive manufacturing (AM), and more particularly to development of polyimide (PI)-based solution, which may be used to form ink for three dimensional (3D) printing by inkjet technology.

BACKGROUND OF THE INVENTION

Additive manufacturing (AM) enables a new manufacturing paradigm, such as the rapid, distributive manufacture of complex objects. In order to expand 3D printing and make it more versatile, new processes are needed that are able to deposit a broader range of materials, including engineering polymers of different characteristics. Engineering polymers are materials with superior thermal stability and mechanical properties that make them valuable in the manufacture of structural products. Examples of engineering polymers include epoxy resins, polyurethanes, polyamides, polyacrylates, polycarbonates, polyesters and polyimides. Engineering polymers have better mechanical properties and/or thermal and chemical stability than the more widely used commodity plastics (such as acrylic materials, polystyrene, PVC, polypropylene and polyethylene).

In the case of POLYJET 3D printing technology, which is based on ink jet, the starting material is a curable formulation based on monomers and/or oligomers, curable mostly by heating or UV-VIS (ultraviolet visible) radiation. The POLYJET process requires strict ink characteristics enabling printing without orifice clogging (see e.g. Chin-Tai Chen (2011). Inkjet Printing of Microcomponents: Theory, Design, Characteristics and Applications, Features of Liquid Crystal Display Materials and Processes, Dr. Natalia Kamanina (Ed.), InTech, DOI: 10.5772/26225.):

- The maximum allowed ink viscosity at jetting temperature is 10-150 mPa s (25-100° C.).
- Ink surface tension 25-55 mN/m (depending on substrate).
- High solid content of at least 20 wt. %.
- Environmental friendliness.
- Low boiling point solvents (<190° C.), but with low evaporation rate at jetting temperature.
- Hardening of the ink: UV curing and/or thermal curing, very fast (less than 20 sec).
- Max particles size, if unavoidable D100=1-2 micron.

Current inkjet technology offers the capability to use a range of polymeric materials with a variety of properties. Common printable polymers are mostly thermoplastic polymers such as, polypropylene, high-density (HD) polyethylene, acrylonitrile butadiene styrene (ABS), polyphenylsulfone (PPSU) or high impact polystyrene (HIPS). However, engineering polymers, especially PIs (polyimides) are not currently used as inks in inkjet AM. Though PI-based inks were proposed, their long curing time (10-60 min) does not enable their use in the POLYJET process (see US Patent Application 2011/0120753A1).

PIs as a class of materials are very promising due to a variety of desirable characteristics they possess, including high thermal stability, excellent mechanical properties, wear resistance, radiation resistance, inertness to solvents, low dielectric constants and good adhesion strengths. There are both thermosetting and thermoplastic PIs. Polyimide synthesis routes include both polycondensation and addition mechanisms. Aromatic PIs are generally prepared by a two-step procedure from aromatic diamines and aromatic tetracarboxylic dianhydrides.

The main obstacles in applying PIs in an inkjet 3D printing technology are: (i) slow curing kinetics accompanied by a release of a low-molecular weight products (water); (ii) very low solid content limiting the printing process; (iii) the use of high boiling point toxic solvents; (iv) the need for imidization and curing processes at elevated temperatures in the range of 150° C.-350° C.; (v) the need to remove high solvent content.

SUMMARY OF THE INVENTION

The present invention relates to a PI-based solution, which may be used to form ink for inkjet 2D and 3D printing. This solution consists of bismaleimide (BMI)—based chemical precursor dissolved in a suitable solvent (Route 1) or a stable suspension of BMI powder in an inert media (Route 2). Other additives may include radical polymerization initiators, photo-initiators, surfactants, stabilizers and reinforcement nano-particles. BMIs are a type of PIs that are used for preparation of thermosetting materials. They consist of imide moieties in low molecular weight pre-polymers that have reactive terminal or pendant groups, which undergo homopolymerization and/or copolymerization by UV, thermal or catalytic means resulting in a formation of cross-linked solid products. Such materials are characterized by relative ease of processing and the ability to tailor specific rheological properties by controlling the molecular weight. Additionally, crosslinked thermosetting PIs have excellent retention of physical properties at high temperatures, in wet environments and in the presence of solvents and lubricating fluids.

An ink substance may be mixed with the polyimide-based solution to form an ink.

The general structure of a BMI is shown here:

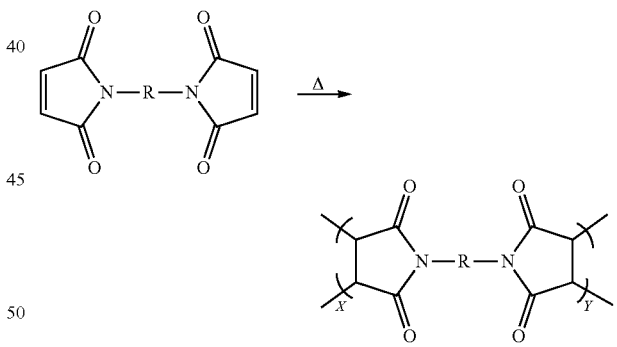

The double bond of the maleimide end-group is highly electron deficient due to the adjacent electron-withdrawing carbonyl groups. Hence, low molecular weight bismaleimide precursors can undergo homo- and/or copolymerization at the carbon-carbon double bond to provide a crosslinked network. Additionally, the unsaturated alkenyl group is a very reactive dienophile and, therefore, can undergo addition reactions such as Michael addition of amines and Diels-Adler addition of dienes.

DETAILED DESCRIPTION OF EMBODIMENTS

In one embodiment, the solution development is based on a solution of reactive BMI oligomers dissolved in organic solvent (Route 1).

The solution contains α,ω-Bismaleimide terminated oligomers with or without reactive additives.

The α,ω-Bismaleimide compound is defined by a general formula (1):

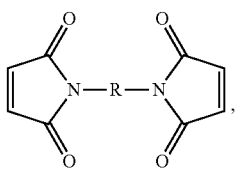

wherein R represents an aliphatic, aromatic or a mixed aliphatic and aromatic groups.

The reactive BMI containing oligomers include liquid or powder BMI resins and/or imide-extended BMI oligomers with the average molecular weight up to 10,000, preferably from 500 to 3000 Daltons.

The reactive additives include oligomeric polyamines that undergo Michael addition reaction with α,ω-Bismaleimide terminated oligomers.

Suitable organic solvents are characterized by a boiling temperature below 190° C. and low evaporation rate, lower than 1 (preferably lower than 0.3).

The suitable solvents include alcohols, or esters of carboxylic acids defined by a general formula (2):

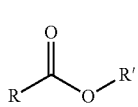

wherein R and R' represent different alkyl groups, which are not related to those mentioned in formula (1).

The oligomeric BMI component undergoes quick curing (1-20 seconds per layer), forming a three-dimensional network of a thermosetting polymer material.

The curing can be done by a thermal treatment, UV irradiation, or both.

Photo-curing can be done by UV sources, such as Xe lamp, mercury lamp, LED UV lamp, intense pulsed light (IPL), or UV laser, with intensity of up to 2000 J/cm$^2$ in the UV-VIS spectral range.

For enhancement of UV curing, photo-initiators can be added at 0.1-5 wt. %. The examples of photo-initiators are a-hydroxyketones, Bis(2,4,6-trimethylbenzoyl)-phenylphosphineoxide, or their combination.

Thermal curing can be done by UV-VIS radiation or conduction, for example by using IR lamp, and/or heating of the printed surface by heating of the printing tray or the environment in the chamber.

Thermal curing can be enhanced by addition of peroxide catalyst, such as dicumyl peroxide (added at 0.01-2 wt. %) or epoxy catalyst.

EXAMPLE

BMI-based solutions were prepared by mixing BMI precursor in different solvents, such as butyl acetate, hexyl acetate, or ethyl caproate from Sigma Aldrich. Imide-extended or linear-chain extended BMI oligomers, such as BMI1400, BMI1500, BMI1700, BMI3000, or BMI689 from Design Molecules Inc. were used as Bismaleimide precursors. The homogeneous nature of the solutions was assisted by a vortex mixer, Velp. Scientifica, ZX classic at 3000 rpm for 1 min, and a sonicator, Kudus, SK221OHP at 53 kHz and 40° C. for 30 min. Solubility of the Irgacure 819 photoinitiator from BASF Dispersions & Pigments was achieved by heating the BMI-based solution in an oven up to 85° C. The viscosity of BMI-based solutions was measured by a viscometer (DV-I Prime, Brookfield) with thermoregulation by water circulation (Ministat 125, Huber). The examples of achieved viscosities at various tempeartures are shown in Table 1.

TABLE 1

Viscosities of the BMI-based solutions

| Solution composition | Temperature (° C.) | Viscosity (mPa · s) |
|---|---|---|
| BMI3000 (30 wt. %) in n-Buthyl Acetate | 40 | 11 |
|  | 50 | 9 |
|  | 60 | 7 |
| BMI3000 (40 wt. %) in n-Buthyl Acetate | 40 | 29 |
|  | 50 | 19 |
|  | 60 | 16 |
| BMI3000 (40 wt. %) in Hexyl Acetate | 40 | 88 |
|  | 60 | 21 |
|  | 65 | 14 |
| BMI689 (60 wt. %) in Hexyl Acetate | 40 | 15 |
|  | 60 | 9 |
|  | 65 | 7 |
| BMI689 (80 wt. %) in Hexyl Acetate | 40 | 65 |
|  | 60 | 24 |
|  | 65 | 19 |

The invention is not limited to these examples.

What is claimed is:

1. A curable liquid composition for inkjet 3D printing comprising:
    (A) Bismaleimide (BMI) α,ω-terminated compound defined by the general formula (1):

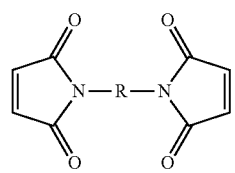

where "-R-" is a bivalent spacer that include hydrocarbon group comprising alkylene-, alkylidene-, arylene-, aralkylene-, alkarylene- groups, and groups, containing heteroatoms comprising Si, O, S, N and P.
    (B) Organic diluent or solvent
    (C) Reactive additives, wherein said reactive additives (C) comprise curing initiators, reagents and surfactants, and wherein said α,ω-BMI-compound (A) is used as a stable suspension of a micronized powder in said organic diluent (B) in combination with said reactive additives and surfactants (C).

2. The composition according to claim 1, wherein said α,ω-BMI-compounds (A) are used as a low viscous solution in a suitable Organic solvent (B) in combination with said reactive additives (C).

3. The composition according to claim 1, wherein said α,ω-BMI-compounds (A) undergoes quick thermal- and (or)

photo-initiating curing during inkjet 3D printing process (1-20 sec. per layer) in the presence of the Reactive additives (C).

4. The composition according to claim 1, wherein said solvents (B) having a boiling temperature below 190° C. and an evaporation rate lower than 1.

5. The composition according to claim 1, wherein said solvents (B) comprises Alcohols, Mono-alkyl ethers, comprising 2-Ethoxyethanol or 2-Butoxyethanol and Alkyl carboxylates comprising n-Alkyl Acetates and n-Alkyl Propionate with Alkyl=$C_nH_{2n+1}$, n=4-8.

6. The composition according to claim 1, wherein said Bismaleimide (BMI) α,ω-terminated compound is mixed with a solvent to form a BMI-based solution that has a viscosity of 7-88 mPa.s at 40-65° C.

7. The composition according to claim 1, wherein said α,ω-BMI-compound (A) has a molecular weight from 250 to 10,000 Dalton and can be represented as an individual compound or as a α,ω-Bismaleimide-terminated oligomer.

8. A curable liquid composition for inkjet 3D printing comprising:
(A) Bismaleimide (BMI) α,ω-terminated compound defined by the general formula (1):

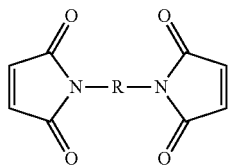

(1)

where "-R-" is a bivalent spacer that include hydrocarbon group comrising alkylene-, alkylidene-, arylene-, aralkylene-, alkarylene- groups, and groups, containing heteroatoms comprising Si, O, S, N and P.
(B) Organic diluent or solvent
(C) Reactive additives, wherein said reactive additives (C) comprise curing initiators, reagents and surfactants, and wherein said α,ω-BMI-compound (A) is used in combination with said reactive additives, wherein one of said reactive additives comprises oligomeric polyamine containing reactive N-H bonds, that undergoes Michael addition reaction to said BMI-compound during the thermal curing process.

9. The composition according to claim 8, wherein said α,ω-BMI-compound (A) is used as a low viscous solution in a suitable Organic solvent (B) in combination with Reactive additives (C).

10. The composition according to claim 8, wherein said α,ω-BMI-compounds (A) undergoes quick thermal- or photo-initiating curing during inkjet 3D printing process in the presence of the Reactive additives (C).

11. A curable liquid composition for inkjet 3D printing comprising:
(A) Bismaleimide (BMI) α,ω-terminated compound defined by the general formula

(1)

where "-R-" is a bivalent spacer that include hydrocarbon group comprising alkylene-, alkylidene-, arylene-, aralkylene-, alkarylene- groups, and groups, containing heteroatoms comprising Si, O, S, N and P.
(B) Organic diluent or solvent
(C) Reactive additives, wherein said reactive additives (C) comprise curing initiators, reagents and surfactants, and wherein said α,ω-BMI-compound (A) has a molecular weight 689 Dalton and can be used alone or in a mixture with other BMI-compounds.

* * * * *